Feb. 21, 1956

D. E. SUNSTEIN 2,736,021

SIGNAL INTEGRATING SYSTEM

Filed Dec. 24, 1953

INVENTOR.
DAVID E. SUNSTEIN
BY
Brown, Denk & Lynnestvedt
AGENTS

Feb. 21, 1956  D. E. SUNSTEIN  2,736,021
SIGNAL INTEGRATING SYSTEM
Filed Dec. 24, 1953  4 Sheets-Sheet 2

INVENTOR.
DAVID E. SUNSTEIN
BY
Brown, Jenks & Lynnestvedt
AGENTS

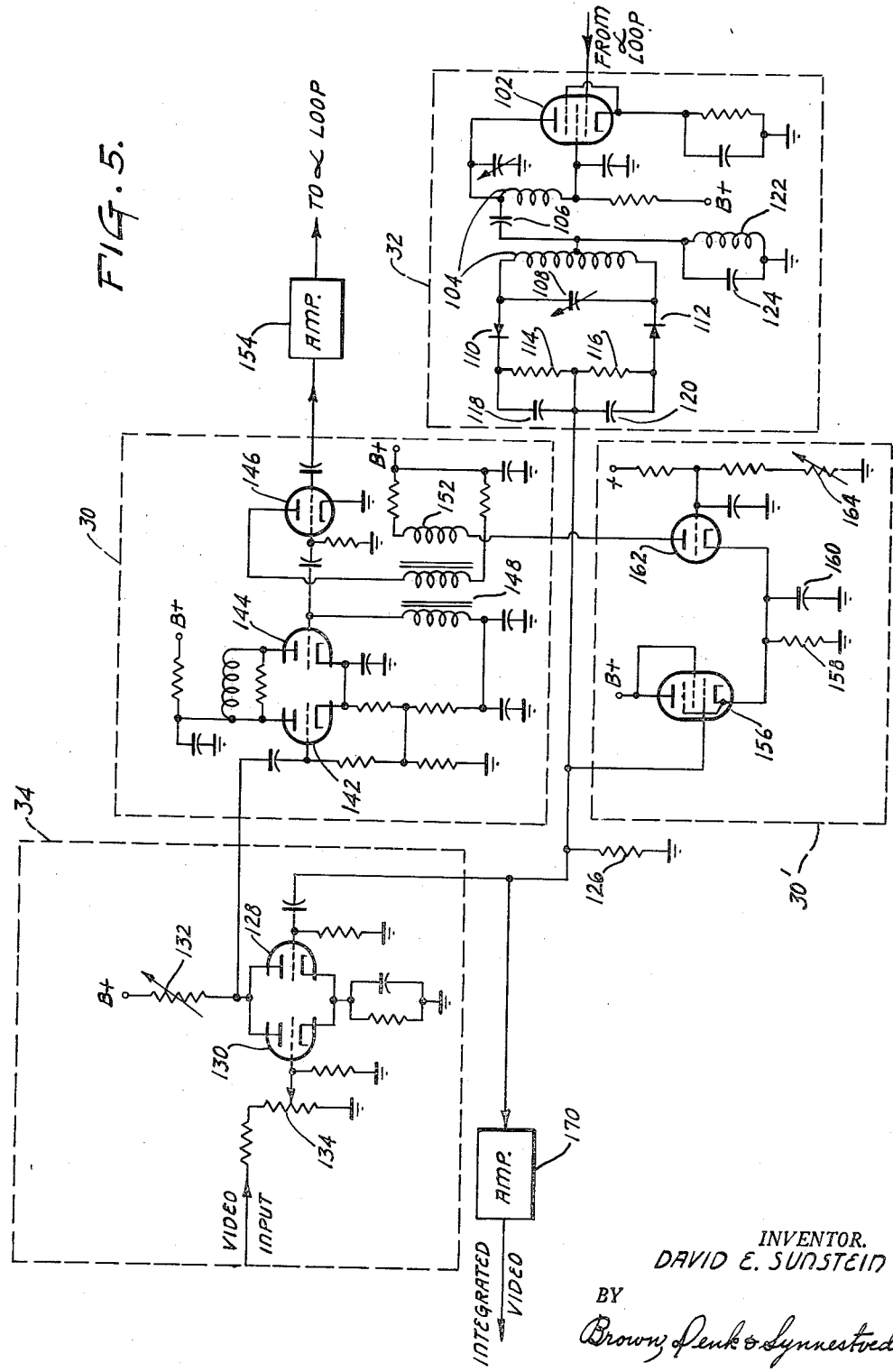

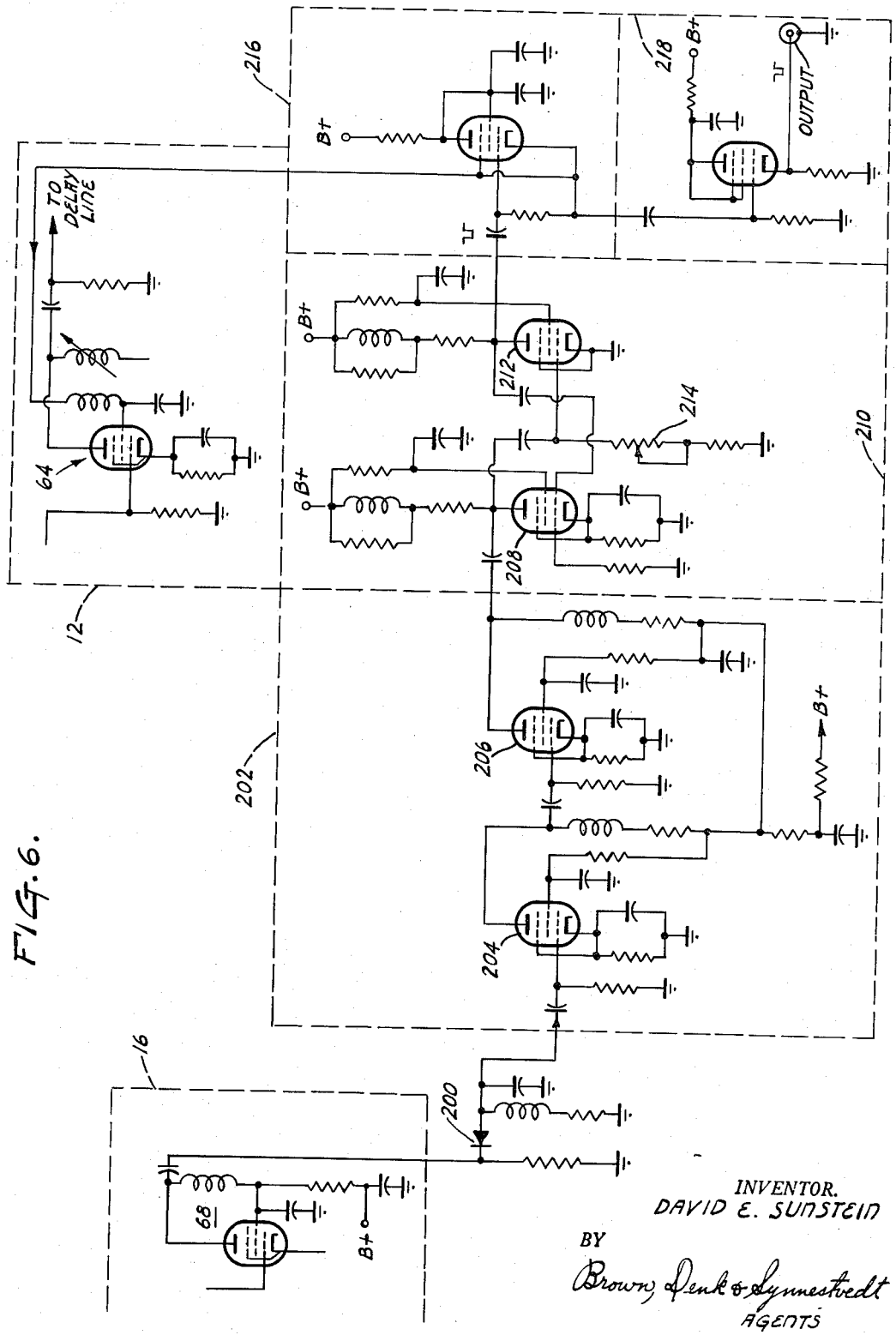

United States Patent Office 2,736,021
Patented Feb. 21, 1956

2,736,021

SIGNAL INTEGRATING SYSTEM

David E. Sunstein, Bala-Cynwyd, Pa., assignor to Philco Corporation, Philadelphia, Pa., a corporation of Pennsylvania Application December 24, 1953, Serial No. 400,179

9 Claims. (Cl. 343—17.2)

This invention relates to signal integrating systems and more particularly to systems for integrating signals containing periodically recurring pulse series. In general the invention relates to certain improvements of the system disclosed in the copending application, Serial No. 281,414, assigned to the assignee of the present invention.

In a radar system, the video signal resulting from target-reflected echoes consists of series of pulses which recur periodically at the repetition frequency of the radar system. Superimposed on this series of target-reflected echo pulses is a random signal resulting from the combined effects of ground or sea clutter and noise signals generated within the receiver of the radar system. This random clutter signal makes it difficult if not impossible to detect small targets, for example a submarine snorkel, under normal or rough sea surface conditions by the use of non-integrating radar receivers.

Integrator circuits, commonly called "sweep integrators," have been developed for improving the signal-to-noise and the signal-to-clutter ratio of a radar system. Basically a sweep integrator consists of a memory circuit, such as an ultrasonic delay line, with a controlled feedback circuit coupling the output of the memory circuit to the input thereof to form a recirculating signal loop. The delay time of the memory circuit is chosen equal to the radar pulse repetition period. Radar video signals are introduced into the recirculating signal loop where they are combined with previously introduced radar video signals. An output signal proportional in amplitude to a selected characteristic of the combined signal is derived from the recirculating loop. The name "sweep integrator" is applied to these circuits for the reason that the system stores at one time all echoes received from a particular transmitted pulse. These echoes comprise one radar "sweep."

Sweep integrators operate on the principle that the frequency distribution of a recurrent series of pulses is a line spectrum with the lines located at harmonics of the pulse repetition frequency whereas the spectrum of random noise and certain types of clutter signals is more or less uniformly distributed over the entire video passband. The sweep integrator is so constructed and arranged that periodic signals representing echoes from targets add linearly in the recirculating loop while aperiodic signals, resulting from clutter and thermal noise, add in the more gradual, root mean square manner. As a result, the signal-to-noise and/or clutter ratio in the recirculating loop is greater than the corresponding ratio of the unintegrated signal. The improvement of the signal-to-noise and/or clutter ratio is a function of the number of successive pulse series stored as a sum in the recirculating loop. In a typical application of the sweep integrator it may be desirable to store with appreciable strength the sum of as many as 50 to 100 successive series within the recirculating loop. In order to achieve optimum storage of 50 to 100 successive series with exponential memory (based on the criterion of peak signal to R. M. S. noise) the feedback factor must be equal to .98 or .99. The feedback factor will approach the value 1 as the number of series to be stored increases but must average less than 1 if the system is to be stable or non-oscillatory.

A pulse series may represent intelligence in a number of ways. For example, the intelligence may be represented by changes in the amplitude or time position of video pulses in a series. If the pulses are not video pulses but are bursts of a carrier frequency, intelligence may be represented by changes in the carrier frequency from pulse to pulse. If a signal of constant frequency and constant amplitude is combined with these pulses of carrier frequency, the intelligence bearing signal becomes an oscillatory signal which undergoes a momentary frequency deviation at the instant that a "pulse" occurs. The extent of the frequency deviation is determined by the intelligence represented by the pulse. It should be noted that this oscillatory signal may be of constant amplitude since the intelligence is represented solely by changes in frequency of the signal. The representation of intelligence by changes in amplitude of a signal is subject to the disadvantage that every network or circuit through which a signal passes changes the amplitude thereof in one way or another. On the other hand, very few circuits have any appreciable effect on the frequency of signals passing therethrough. Therefore I have found it advantageous to store intelligence in the recirculating signal loop as changes in frequency of the recirculating signal.

To give one specific example of the advantages to be derived from storing intelligence as a shift in frequency, it has been found that any irregularities around the feedback loop of an amplitude modulated sweep integrator system are exaggerated by the factor $$\frac{1}{1-f}$$

where $f$ is the feedback factor of the recirculating loop. In a frequency modulation system there is no such amplification of irregularities in the feedback loop.

In the sweep integrator disclosed and claimed in the above-mentioned copending application, the recirculating signal loop is arranged to have an intelligence feedback factor of exactly one—that is, there is no circuit element in the main recirculating loop which, by itself, tends to alter any frequency deviation impressed on the recirculating signal. The desired intelligence feedback factor of .98 or .99 is achieved by providing a low gain auxiliary loop which extracts a signal from a selected point in the main recirculating loop and feeds back a degenerative signal at a second point in the recirculating loop. In the sweep integrator described in the copending application, the direction of energy flow in the degenerative loop is opposite to that in the main loop. I have discovered that this arrangement unduly limits the high frequency response of a frequency modulated sweep integrator system. In particular, it was found that a sweep integrator system constructed in accordance with the teachings of the copending application and using circuit elements now available operates satisfactorily only for pulses having a duration of 1 microsecond or more.

I have discovered that the aforementioned difficulty results from an undesirable shift in phase between the signal in the main recirculating loop and that in the auxiliary loop. I have discovered that this difficulty can be overcome by a new and heretofore unknown arrangement of elements in the main and recirculating loops.

Therefore it is an object of the present invention to provide an improved frequency-modulated sweep integrator having a wider passband than previously known circuits.

It is a further object of the present invention to provide an improved sweep integrator circuit requiring less amplification around the main recirculation loop.

Still another object of the present invention is to provide an improved arrangement of the elements in the recirculating loop, whereby the stability of the sweep integrator system is increased.

For a better understanding of the present invention together with other and further objects thereof reference should now be made to the following detailed description which is to be read in conjunction with the accompanying drawings in which:

Fig. 5 is a schematic diagram showing one preferred embodiment of the β loop of Fig. 1; and Fig. 6 is a schematic diagram of an auxiliary timing loop which may be connected to the alpha loop.

The general mode of operation of the present invention will now be explained with reference to the block diagram of Fig. 1. A frequency modulated sweep integrator constructed in accordance with the teachings of the present invention can be divided generally into two parts. The first part consists of a main recirculating (alpha) loop. The alpha loop has two general functions: the first is to generate a substantially constant frequency signal on which deviations representing signal intelligence may be impressed and the second is to store this generated signal, with any deviations impressed thereon, and to cause the deviations to reappear at a particular point in the circuit at intervals corresponding to the pulse repetition period of the signal to be integrated. The alpha loop has a voltage gain and an intelligence feedback gain of substantially unity for all frequencies within the range to be integrated. By unity voltage gain it is meant that the amplitude of a signal once introduced in the recirculating loop will continue at that same amplitude indefinitely. This voltage gain may be held at unity by any suitable oscillation amplitude limiter. It should be kept in mind that the amplitude of the recirculating signal is not employed to transfer or store intelligence in the loop, and therefore this gain may remain at a value of unity regardless of the information stored in the alpha loop. The intelligence feedback gain of the alpha loop may be defined as the ratio of the intelligence stored in the recirculating loop, for one passage of the signal around the recirculating loop, to the intelligence stored in the recirculating loop on the previous passage of the signal around the loop provided no intelligence is added between these two recirculations of the signal. If the intelligence feedback gain is unity, any intelligence, once introduced into the recirculating loop, will continue to circulate indefinitely unless removed by some other means. As explained above, intelligence is stored by a momentary deviation of the frequency of the signal circulating around the alpha loop. If the intelligence feedback gain of the alpha loop is unity, a momentary deviation, once introduced in the recirculating signal of the alpha loop, will continue to pass around the alpha loop unchanged in extent until this deviation is either increased or reduced by some means external to the alpha loop. It is one of the advantages of the frequency modulated sweep integrator that the voltage feedback gain and the intelligence feedback gain are substantially independent of one another.

Figure 1:
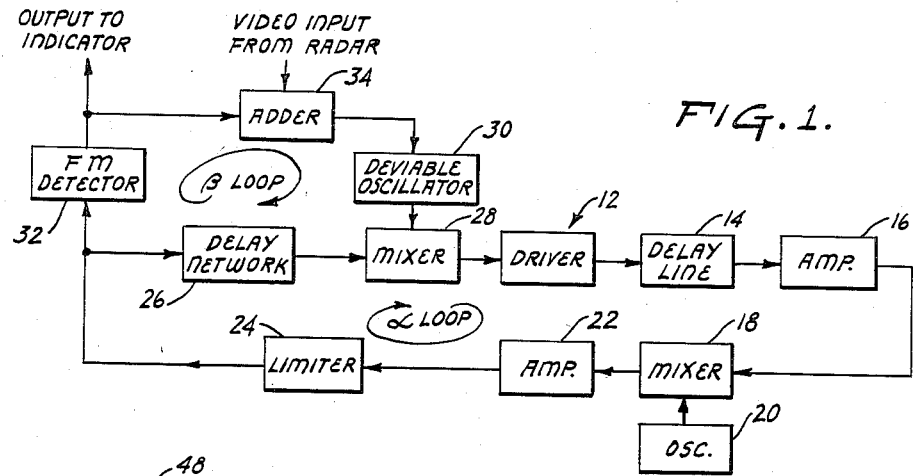
Fig. 1 is a block diagram of one preferred embodiment of the present invention.

The second portion of the block diagram of Fig. 1 is designated as the beta loop. The beta loop performs three functions. The first function is to provide stability of the carrier frequency generated by the alpha loop. The second function is to cause some reduction in the effective intelligence feedback factor of the alpha loop. This is accomplished by causing some reduction in the frequency deviations of the signal circulating around the alpha loop each time the signal passes around this loop. The third function of the beta loop is to provide a method of introducing intelligence into the alpha loop. This function is accomplished by providing means for introducing a deviation from the natural frequency of the signal which circulates around the alpha loop.

Turning now more specifically to the block diagram of Fig. 1, the alpha loop comprises a driver amplifier 12 which supplies signals to a delay line 14. Delay line 14 may be any form of delay line having a delay time substantially equal to the pulse repetition period of the radar system or the circuit with which the sweep integrator is associated. Since this period will be relatively long, delay line 14 is preferably an ultrasonic delay line having a solid delay medium. The delay time of this delay line is only approximately equal to the pulse repetition period of the radar system since it is the total of the delay around the alpha loop that must be equal to the pulse repetition period and not the delay in the delay line 14 alone. An amplifier 16 is coupled to the output of the delay line 14. The function of amplifier 16 is to increase the amplitude of the recirculating signal to make up for attenuation of this signal in delay line 14. The output of amplifier 16 is connected to one input of a mixer 18. An oscillator 20 supplies a fixed frequency signal to a second input of mixer 18. A signal having a frequency equal to the sum of difference of the two signals supplied to mixer 18 is supplied to a third amplifier 22. The signal from amplifier 22 is passed through a limiter 24. In general the voltage gain for a signal in the alpha loop, having an amplitude less than the value at which limiter 24 becomes operative, is much greater than unity. The regeneration resulting from this large gain causes any small amplitude signal to increase in amplitude. When the amplitude of the signal increases to a value set by the limiter, any further increase in amplitude provided by the amplifiers is removed by the limiter. Under these conditions a signal will build up to the maximum set by limiter 24 and then remain at this value as long as the system is in operation.

The output of limiter 24 is supplied to the input of a delay network 26. Delay network 26 is provided to compensate for the delay encountered by a signal passing through the beta loop. In general the delay encountered in the beta loop is small but it does produce a definite adverse effect on the overall bandwidth of the sweep integrator unless it is compensated for in the manner described above. Delay network 26 may be a section of coaxial line, an ultrasonic delay line, or any convenient wide band delay network. If maximum band width of the sweep integrator is not essential, delay network 26 may be omitted. The following description of the invention points out circumstances under which this may be done.

The signal at the output of delay network 26 is supplied to one input of a mixer 28. The second input to mixer 28 is obtained from a deviable oscillator 30 in the beta loop. The undeviated frequency of oscillator 30 is chosen to be approximately equal to the frequency of oscillator 20. A signal having a frequency equal to the difference or sum of the frequencies of the signals supplied to the two inputs of mixer 28 is supplied to the input of driver 12 to complete the alpha loop. Mixers 18 and 28 are so arranged that mixer 18 alters the frequency of the signal passing therethrough by a fixed amount and mixer 28 again alters the frequency of the recirculating signal but in the opposite direction. The average shift in frequency introduced by oscillator 30 is made exactly equal to the shift in frequency introduced by mixer 18, but the instantaneous shift introduced by mixer 28 is a function of stored and input signal intelligence.

The input to the beta loop is supplied with a signal from the output of limiter 24. This signal is supplied to an FM detector 32 which has a center frequency approximately equal to the natural frequency of the recirculating signal in the alpha loop. The FM detector 32 converts the momentary deviations of the signal circulating in the alpha loop to video signals. These video signals are supplied to one input of a voltage adder circuit 34. A second input of adder circuit 34 is supplied with unintegrated video signals from a radar system associated with the sweep integrator. The output of adder circuit 34 is a video signal having an amplitude proportional to the sum of the instantaneous amplitudes of the signals supplied thereto. This video signal is supplied to deviable oscillator 30 to control the frequency thereof. As will be explained in greater detail later, this video signal causes the signal supplied by deviable oscillator 30 to deviate from its average frequency by an amount proportional to the amplitude of the video signal supplied by adder 34. The output of the sweep integrator is taken from the output of FM detector 32 in the beta loop. The output signal at this point is an integrated video signal which may be applied directly to a conventional cathode-ray tube indicator. If it is desired to obtain an integrated signal at some carrier frequency rather than at video, it will be possible to extract such a signal from any point in the alpha loop. Three preferred points would be the output of amplifier 16 or the output of amplifier 22, and the output of limiter 24, since the signals at these points are at a relatively high amplitude level. For reasons which will appear presently, the carrier frequencies at two of these points differ from one another by an amount equal to the shift in frequency introduced by mixer 18. The phasing of the signal around the beta loop is such that the beta loop reduces the effective intelligence feedback gain of the alpha loop. In other words, the signal derived by FM detector 32 from a frequency deviation appearing at the output of limiter 24 will result in a signal being supplied to deviable oscillator 30 which will tend to reduce the deviation of the signal in the output of mixer 28. The gain of the beta loop is made relatively low for signals above a certain minimum frequency so that the effective gain of the alpha loop is reduced by only a small amount to a value only slightly less than unity. The optimum gain for the beta loop will depend, to a certain extent, on the characteristics of the radar system or other circuit with which the sweep integrator system is to operate. It can be shown that there is a definite relationship between the effective feedback factor of a sweep integrator and the number of echo signals received from a target for maximum improvement in the signal-to-noise ratio. For example, in a radar system in which signals are received from a single target in response to 50 successive transmitted pulses, the optimum effective intelligence feedback factor of the sweep integrator is approximately 0.97. Since the effective feedback factor of an FM sweep integrator of the type disclosed herein is equal to the intelligence feedback factor of the alpha loop minus the intelligence gain of the beta loop, it can be seen that the gain of the beta loop should be approximately .03 in the exemplary situation given above. In general, the gain of the beta loop will fall within the range of 0.1 to 0.01 for most radar applications. For reasons which will be pointed out in greater detail in connection with the description of the preferred embodiment of the present invention shown in Figs. 4 and 5, the low frequency or D.-C. gain of the beta loop is made relatively high in order to control the undeviated frequency of oscillator 30. It is believed that the operation of the sweep integrator system shown in Fig. 1 will be more easily understood if certain typical values are assumed.

Therefore, it will be assumed that the zero output frequency of FM detector 32 is 48.5 megacycles and that appropriate circuits are provided in the beta loop for maintaining the natural frequency of oscillation of the alpha loop at this assumed value. The further assumption will be made that deviable oscillator 30 has an average frequency of 81 megacycles.

If no intelligence is stored in the recirculating loop, the signal supplied by mixer 28 to driver 12 will have a frequency of 32.5 megacycles. Driver 12, delay line 14, and amplifier 16 are designed so as to have a relatively wide passband, for example approximately 9 megacycles, centered at this frequency. Mixer 18 receives the 32.5 megacycle signal from amplifier 16 and a signal at 81 megacycles from oscillator 20 and supplies a signal at 48.5 megacycles to amplifier 22. This signal will pass through limiter 24 and delay network 26 to the input of mixer 28 where it is reheterodyned to 32.5 megacycles. Since the signal appearing at the input of detector 32 is equal to the assumed zero output frequency of this circuit, the beta loop will make no change in the frequency of the recirculating signal. Therefore a signal will continue to circulate in the alpha loop, the frequency between the output of mixer 18 and the input of mixer 28 being 48.5 megacycles and in the other half of the loop 32.5 megacycles. This signal is a continuous signal in the sense that a signal at one of the frequencies mentioned is always present at any selected point in the recirculating loop. The amplitude of this signal will remain constant as a result of the action of limiter 24. Now, if a single video pulse having an amplitude indicative of certain intelligence is supplied to adder 34, a video pulse of preselected polarity, for example positive, will be supplied to deviable oscillator 30. This pulse will cause the frequency of deviable oscillator 30 to shift momentarily from its assumed frequency of 81 megacycles by an amount proportional to the amplitude of the video signal. In this illustration, it will be assumed that the video pulse shields the frequency of deviable oscillator 30 by 0.1 megacycle. The frequency of this oscillator thus becomes 81.1 megacycles but only for the duration of the applied positive pulse. This signal, when heterodyned with the signal at a frequency of 48.5 megacycles received from delay network 26, will cause the frequency of the signal supplied to driver 12 to shift to 32.6 megacycles for a short time interval. The 32.6 megacycle signal will heterodyne with the 81 megacycle signal from oscillator 20 in mixer 18 so that the signal supplied to amplifier 22 will be at a frequency of 48.4 megacycles. This 48.4 megacycle signal will reappear at the input of mixer 28 at a time after the initial shifting frequency of deviable oscillator 30 which is equal to the delay time around the alpha loop. If it is assumed that deviable oscillator 30 is once again operating at its normal frequency of 81 megacycles, the 48.4 megacycle signal will heterodyne with the 81 megacycle signal to supply a second signal of 32.6 megacycles to amplifier 12. It should be remembered that this second 32.6 megacycle signal occurs for only a brief interval of time equal to the duration of the original video pulse. At all other times the signal to driver 12 is the 32.5 megacycle signal which is the natural frequency of oscillation of the alpha loop. The fact that a 32.6 megacycle signal, initially generated by the deviation is oscillator 30, continues to circulate around the loop at that same frequency is illustrative of the fact that the alpha loop has the unity intelligence feedback gain. However, in actual practice, the frequency of deviable oscillator 30 will not be exactly 81 megacycles at the time the 32.6 megacycle signal reappears at mixer 28. The reason for this is that the 32.6 megacycle signal appearing at the input of FM detector 32 causes a small video signal to appear at the output of this circuit. This small signal causes a negative signal to appear at the output of adder 34. This negative signal changes the frequency of operation of oscillator 30 by an amount which is a small fraction of the initial 0.1 megacycle shift introduced by the video signal. If we assume that the beta loop has a gain of .02, the frequency of oscillator 30 will be shifted by an amount equal to 0.1 times .02 or .002 megacycle. This shift will be in a direction to lower the frequency of oscillator 30 so that the signal supplied to driver 12 will be equal to 32.6 megacycles minus .002 megacycle. This illustrates the manner in which the beta loop reduces the intelligence feedback gain of the sweep integrator to some value less than unity, in this case to a value of .98.

If, at the time the recirculating signal generated by the initial video pulse reappears at the input of mixer 28, a second video pulse is supplied to adder 34, deviable oscillator 30 will be shifted in frequency by an amount proportional to the algebraic sum of the signal resulting from the second video pulse and the degenerative video signal derived from FM detector 32. Therefore the signal supplied to driver 12, immediately following the occurrence of the second video signal, will be 81.1 minus 48.4 minus .002 megacycle or 32.7 megacycles minus the .002 megacycle resulting from the degenerative action of the beta loop. If the second video signal has an amplitude twice the amplitude of the first video signal, the signal supplied to driver 12 will be 81.2 minus 48.4 or 36.8 megacycles rather than 32.7 megacycles mentioned above. The reason for this is that the frequency of oscillator 30 is deviated by an amount proportional to the amplitude of the incoming signals. If an uninterrupted series of video pulses is supplied to adder 34, the frequency shift in the alpha loop resulting from these pulses will increase until the degenerative shift in frequency resulting from the action of detector 32 is equal to the regenerative shift in frequency supplied by the next video signal. In the example given above this will occur when the total deviation stored in the alpha loop is approximately equal to 50 times the deviation resulting from a single pulse. Under the conditions given above, the outut signal from FM detector 32 will be a video signal which is approximately 50 times the amplitude of the signal resulting from the application of one pulse to the alpha loop. However, the amplitude of the noise in the output of FM detector 32 is much less than 50 times the amplitude of the noise supplied with the video signals to adder 34. This is due to the fact that the noise adds in a root means square manner in the recirculating loop, while the video pulses add in a linear manner.

Figure 3:
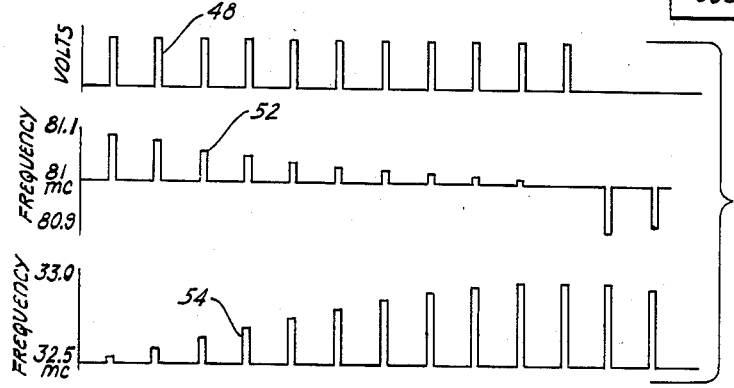
Figs. 2 and 3 are plots showing certain time signal frequency relationship of the system of Fig. 1.
Figure 2:
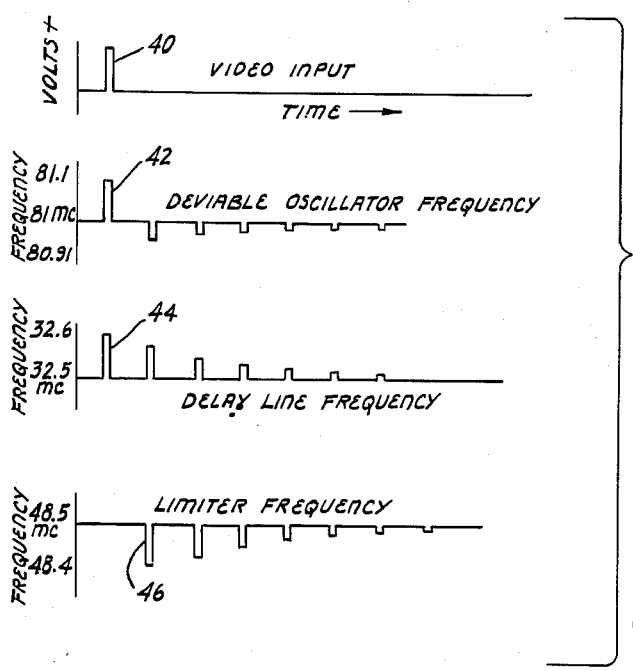

Figs. 2 and 3 illustrate in graphical form the frequency relationships described above. Fig. 2 illustrates the changes in frequency which take place at various points in the system of Fig. 1 when a single video pulse 40 is supplied to the input of adder 34. As shown by waveform 42, the frequency of the oscillator 30 momentarily increases in response to the pulse 40 and then periodically decreases as the frequency-shifted signal periodically reappears at the input to the beta loop. The spacing between successive pulses in waveform 42 is equal to the total delay around the alpha loop. Waveform 44 illustrates the manner in which the frequency deviation introduced in the alpha loop gradually diminishes as a result of the degenerative action of the beta loop. Waveform 44 represents the signal at the delay line input. Waveform 46 represents the frequency of the signal at the output of mixer 18.

Fig. 3 illustrates the changes in frequency which take place when eleven video pulses 48 of uniform amplitude are supplied to the input of adder 34. Waveform 52 represents the frequency of the signal supplied by oscillator 30. This signal has an initial deviation equal to the deviation of waveform 42 in Fig. 2. However, on successive pulses the degenerative signal from the beta loop combines with the video pulses supplied to adder 34 and gradually reduces the deviations of oscillator 30. Waveform 54 shows that the frequency of the recirculating signal increases to a point where the degenerative signal generated by the beta loop asymptotically approaches the amplitude of the incoming video pulses. It will be remembered that the amplitude of this degenerative signal is proportional to the deviation of the recirculating signal from its normal value. Waveforms 52 and 54 have different frequency scales.

Waveform 52 also illustrates the manner in which the deviation of oscillator 30 changes direction following the termination of the pulse series in order gradually to clear the alpha loop of stored information. The frequency relationships that exist in the system, following the termination of a pulse series, follow the pattern of Fig. 2.

In the example given above, it has been assumed that only one series of pulses is stored in the sweep integrator at one time, these pulses being spaced apart in time by the relay time of the alpha loop. It will be clear to those skilled in the art that several series of pulses may be stored in the integrator at one time. In fact, these series of pulses may be spaced apart by as little as a pulse width without causing any interference in the operation of the sweep integrator. It is for this reason that the sweep integrator can integrate the numerous echoes that may result from a single transmitted pulse of a radar system. Since the radar pulses are transmitted at regular intervals, the numerous echoes resulting from a single transmitted pulse combine to form numerous pulse trains resulting from successive transmitted pulses. Each of these pulse trains is individually integrated in the system of Fig. 1.

Figure 4:
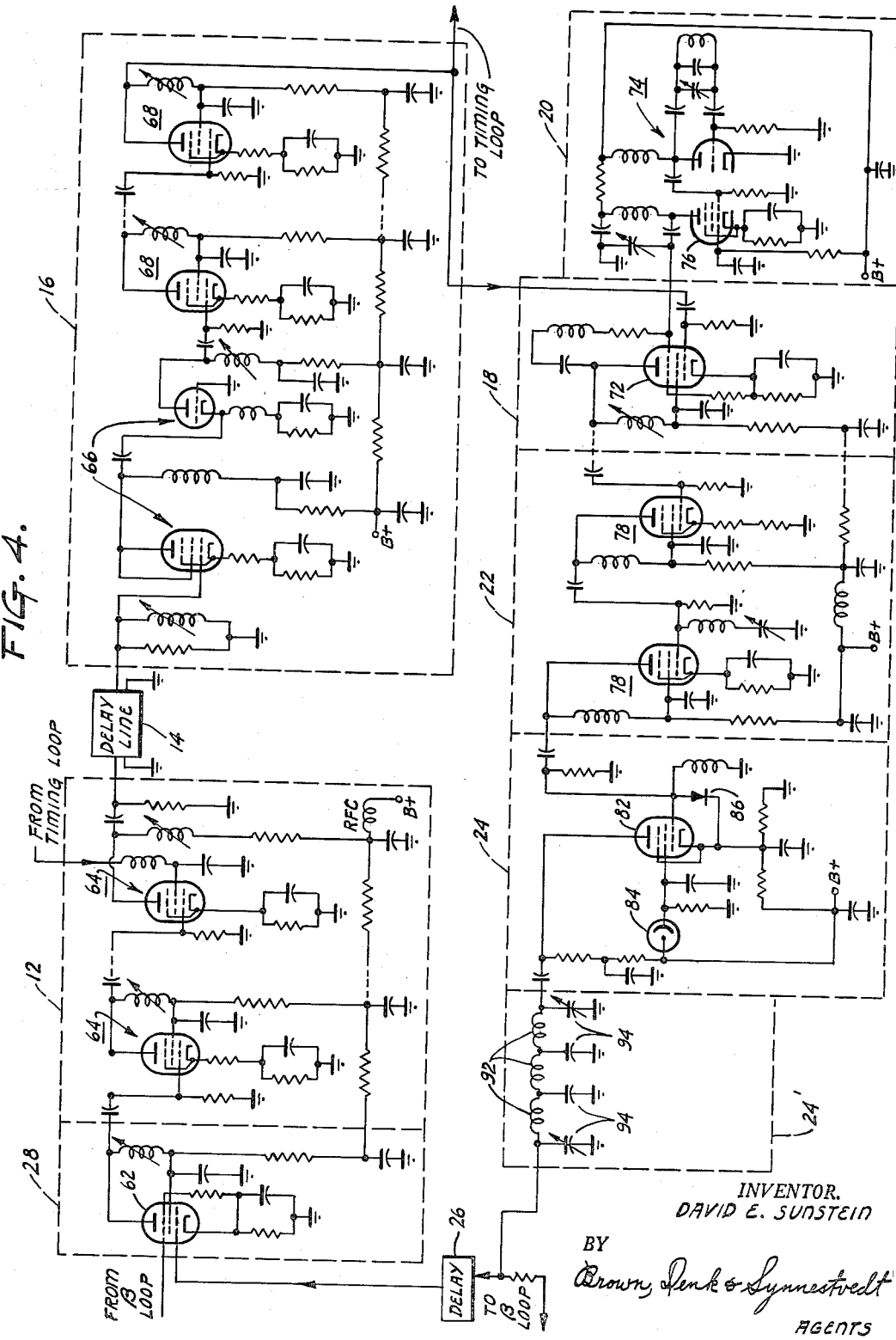
Fig. 4 is a schematic diagram of the α loop of Fig. 1.

Reference should now be made to Figs. 4 and 5 which show in greater detail the circuits which make up the various blocks of Fig. 1. For the convenience of the reader, the circuits have been grouped and numbered in accordance with the block diagram of Fig. 1. The extent of each sub-circuit is identified by a broken line bearing a reference numeral corresponding to the related block of Fig. 1. In Fig. 4, the circuit within the broken line 28 corresponds to mixer 28 of Fig. 1. Mixer 28 is a conventional pentode mixer circuit in which the signal from the beta loop is supplied to the third grid of the mixer tube 62 and the signal from delay network 26 is supplied to the first grid of this tube. A 6AS6 mixer tube is a suitable choice for this circuit. The output of mixer 28 is supplied to the driver circuit 12 which comprises several pentode amplifier stages 64. Only two stages are shown in Fig. 2, but a broken line is shown between these two stages to indicate that more stages may be inserted if additional gain or bandwidth is required. The output of driver 12 is supplied to delay line 14. This delay line is again shown in block form but it may comprise a one thousand microsecond quartz delay line. The output of delay line 14 is supplied to amplifier 16 which comprises a Wallman type input circuit 66 followed by single tuned pentode amplifier stages 68. The Wallman type input stage is preferred because of its high signal-to-noise characteristic. Double tuned stages could be employed in both amplifier 12 and amplifier 16. However, it is believed that the single tuned amplifier stages are somewhat easier to build and adjust than the double tuned stages. The output of amplifier 16 is supplied to the first grid of tube 72 in mixer 18. The third grid of tube 72 is supplied with a signal from oscillator 20. As shown in Fig. 4, oscillator 20 comprises a triode Colpitts oscillator 74 followed by a pentode buffer amplifier stage 76. The difference frequency appears at the anode of mixer tube 72 and is supplied to the input of amplifier 22 which comprises several single-tuned pentode amplifier stages 78 in cascade.

The signal from amplifier 22 is supplied to limiter 24. Limiter 24 is a pentode amplifier stage in which the screen voltage of tube 82 is held at a value lower than the anode supply potential by means of a voltage regulator tube 84. Clipping of the positive half cycle of the input signal takes place when the grid of the pentode amplifier stage 82 draws current. A crystal rectifier 86 is connected in shunt with the first grid of tube 82 to lower the conductance during the part of the cycle that the grid draws current. The negative part of the cycle is clipped by driving the first grid of the pentode tube 82 beyond cut off. A low cut-off voltage is maintained by the low screen voltage on tube 82. The limiter is made fast-acting by using a regulated screen supply and low impedance grid and cathode circuits.

Following limiter 24 is a low-pass filter network 24' which is not shown in Fig. 1. This low-pass filter network comprises series inductors 92 and shunt capacitors 94, and is designed to have a cut-off frequency slightly above the frequency of the desired signal in the output of limiter 24. The function of filter 24' is to attenuate harmonics of this desired signal resulting from the clipping action of limiter 24. The output of delay network 24' is supplied to delay network 26 and thence to the first grid of mixer 28 to complete the alpha loop.

Fig. 5 shows the beta loop which is associated with the alpha loop of Fig. 4. The signal from the alpha loop is supplied to the control grid of pentode amplifier tube 102 which forms a part of FM detector 32. Detector 32 is a discriminator circuit of the type described by W. R. Summerhayes, Jr., 30 Proceedings of the IRE 399, September 1942. This discriminator includes a transformer 104 which has one end of the primary winding connected through a capacitor 106 to the center tap of the secondary winding. The secondary winding is tuned to resonance at the center or zero output frequency of the discriminator by capacitor 108. The circuit thus far described is similar to the more conventional Foster-Seeley discriminator which is widely used in frequency modulation systems. Diodes 110 and 112 are connected to the two ends of the secondary winding. As shown in Fig. 5, the anode of one diode is connected to the transformer 104, while the cathode of the other diode is connected to the other end of the secondary winding. In the Foster-Seeley discriminator usually both anodes are connected to the secondary winding. Vacuum tube terminology has been employed to describe the connections of the diodes 110 and 112 but it should be understood that crystal diodes may be employed as well. The terminals of diodes 110 and 112 remote from transformer 104 are connected together through a center-tapped load comprising resistors 114 and 116 in parallel with capacitors 118 and 120. Capacitors 118 and 120 are by-pass capacitors for the carrier frequency supplied to FM detector 32. The center tap of the secondary of transformer 104 is connected to ground through the parallel combination of inductor 122 and capacitor 124. This combination has a relatively high impedance to the carrier frequency supplied to the discriminator but a low impedance to video frequency. The junction of resistors 114 and 116 is returned to ground through a resistor 126. It will be noted that, for video frequencies, resistor 126 is effectively connected between the junction of resistors 114 and 116 and the center tap of transformer 104. The discriminator described above has the advantage that it is balanced to ground and allows a video signal of either polarity to appear across resistor 126.

The signal appearing across resistor 126 is supplied to the control grid of vacuum tube 128 in the duo triode adder 34. Adder 34 also includes triode tube 130. Tubes 128 and 130 have a common load impedance 132. Impedance 132 is in the form of an adjustable resistor which permits control of the gain of the adder stage 34. Any change in the gain of the adder stage changes the gain of the beta loop and the overall intelligence feedback factor of the integrator system. Input video signals are supplied to the control grid of tube 130 through an adjustable potentiometer 134 which adjusts the sensitivity of the sweep integrator system to input pulses. The signal from adder stage 34 is supplied to the deviable oscillator 30. Deviable oscillator circuit 30 comprises a cathode follower stage including tube 142 and a reactance tube stage including triode tube 144. The signal supplied to the cathode of reactance tube 144 from cathode follower 142 varies the gain of tube 144 and thereby varies the input capacity looking into the grid of tube 144. This variation is caused by the so-called Miller effect, by reason of which variations in the input capacity at the grid of a triode are proportional to variations in the gain of the tube. Reactance tube 144 forms a part of the grid circuit of an oscillator which also includes vacuum tube 146. The grid circuit of triode 146 is coupled to the anode circuit through a variable coupling transformer 148 which has a tertiary winding 152 for controlling the inductance of the primary and secondary windings. A direct current through tertiary winding 152 determines the steady flux within transformer 148 and the point on the characteristic curve of the nonlinear core material at which the transformer operates. Therefore the frequency of the signal generated by deviable oscillator 30 may be controlled by video signals supplied to the cathode follower stage 142 or by a direct current supplied to winding 152 of transformer 148. The control exerted by way of the cathode follower stage is the one diagramed in Fig. 1. The output of oscillator 146 is coupled through buffer amplifier 154 to mixer 28. Amplifier 154 is a conventional band pass amplifier and, for this reason, has been shown in block form in Fig. 5.

The signal which energizes winding 152 is derived from the output of discriminator 32. The signal appearing at the junctions of resistors 114 and 116 in detector 32 is supplied to the control grid of a pentode vacuum tube 156 which forms a part of a D.-C. amplifier 30'. The cathode of tube 156 is returned to ground through the parallel combination of resistor 158 and capacitor 160. The time constant of the resistor-capacitor combination is long compared to the time duration of video signals appearing at the output of detector 32. Therefore the signal appearing across resistor 158 is a D.-C. signal which is proportional to the average frequency of the signal supplied to detector 32. A signal appearing across resistor 158 is supplied to the cathode of vacuum tube 162 which forms the second stage of the D.-C. amplifier 30' described above. The anode of tube 162 is connected to winding 152 in deviable oscillator 30 so that the anode current flows through this winding. The grid potential on tube 162 is adjusted by means of potentiometer 164. This controls the normal anode current through winding 152 which, in turn, controls the average frequency of oscillator 30. If the frequency of the average signal circulating around the alpha loop deviates from the center frequency of detector 32, a signal will be supplied to the D.-C. amplifier 30' which is representative of the direction and amplitude of this deviation in frequency. Amplifier 30' supplies a signal to winding 152 which changes the frequency of oscillator 146 in a direction to reduce the deviation. The change in frequency in the alpha loop results when the deviated frequency is heterodyned with the signal supplied by delay network 26. The gain of the beta loop for low frequencies, that is by way of amplifier 30', is made much greater than one in order to hold the average frequency of the recirculating signal near the desired value. However, the large capacitor in the cathode circuits of tubes 156 and 162 limits the upper frequency response of the D.-C. amplifier 30' and thereby prevents the beta loop from responding with a highly degenerative signal at each occurrence of a video pulse across resistor 126.

The integrated output signal of the system shown in Figs. 4 and 5 is obtained from the junction of resistors 114 and 116 in FM detector 32. This signal is passed through a buffer amplifier 170 which is again shown in block form. The output of amplifier 170 may be supplied to the intensity control grid of a conventional cathode ray indicator or to any other device which utilizes the output of a sweep integrator.

Fig. 6 illustrates a circuit which is not strictly a part of the sweep integrator. This circuit generates timing pulses at intervals exactly equal to the delay time around the alpha loop. Therefore this circuit can be employed as a master oscillator for controlling the pulse repetition frequency of a radar system or any other system which generates one or more intelligence bearing pulses spaced in time from an applied synchronizing pulse.

The timing loop of Fig. 6 comprises a detector 200 which receives a signal from the amplifier stage 68 in amplifier 16. For reasons which will appear presently, this signal is a momentary decrease in the amplitude of the carrier frequency signal in the alpha loop. Detector 200 converts this decrease in amplitude of the carrier frequency signal to a positive pulse. This positive pulse results from the fact that the output of detector 200 becomes momentarily less negative. The positive pulse is passed through a two stage pulse amplifier 202 which includes vacuum tubes 204 and 206. The amplified pulse appearing at the anode of tube 206 is supplied to the anode of tube 208 which forms a part of a multivibrator stage 210. Multivibrator circuit 210 is so arranged that tube 208 is normally conducting at the moment the positive pulse arrives at the anode. The rise in anode potential which results from the application of the positive pulse is impressed on the grid of tube 212 which is normally nonconducting. This positive pluse causes tube 212 to conduct. Multivibrator 210 is so constructed and arranged that the two half cycles are of unequal length. In particular, the arrangement is such that tube 212 conducts for one or two microseconds in response to a trigger pulse and then remains cut off for a period of the order of 1000 microseconds. The multivibrator shown in Fig. 6 is a free running multivibrator which has a natural period slightly longer than the total delay time around the alpha loop. This period can be adjusted by means of adjustable resistor 214 in the grid circuit of tube 212.

The negative pulse appearing at the anode of tube 212 is supplied to the screen grid of the final stage 64 in driver 12 through a cathode follower buffer 216. The negative pulse on the screen grid of stage 64 momentarily decreases the amplitude of the circulating signal in the alpha loop. This decrease in amplitude will appear at the ouput of the delay line at a later time and is the signal which results in a new positive pulse being formed by detector 200. The high gain of the alpha loop restores the amplitude of the recirculating signal to its normal value in a very short time, for example one microsecond, after the termination of the negative pulse on the screen grid of stage 64. The decrease in amplitude which appears at amplifier 16 is removed by limiter 24 so that old timing information is not stored in the alpha loop. It should be noted that the delay encountered by the timing signal in the alpha loop results only from delay line 14 and amplifier 16. However, the delay of the timing loop channel is made equal to the delay from the output of amplifier 16 to the final stage of driver 12 in the alpha loop. This is accomplished by properly selecting the bandwidths of the circuits in the timing loop and by adjustment of resistor 214 in multivibrator 210. Adjustment of resistor 214 controls the exact time at which the normally free running multivibrator 210 is triggered by the pulse from amplifier 202. This control is possible due to the slightly sloping leading edge of the signal from amplifier 202. The trigger pulses which are supplied to the intelligence generating system, for example a radar system, are obtained from a cathode follower buffer 218 which is energized by the signal appearing at the anode of tube 212. The timing loop described above is not the only circuit that may be employed in conjunction with the sweep integrator of Fig. 1 to generate master timing pulses, but the one described above has proved to operate satisfactorily. The delay line of the sweep integrator may be employed for still other purposes by multiplexing different circuits in the manner described above. For example the delay line can form a part of a delay and subtraction type filter without affecting its operation as a sweep integrator provided the signal to be filtered is impressed as an amplitude modulation on the recirculating signal.

It is to be understood that various modifications and changes may be made in the circuits shown and described herein without departing from the intended scope of the hereinafter appended claims. This is particularly true of the detailed circuits of Figs. 4, 5 and 6 which are included mainly to disclose one preferred circuit for practicing the invention.

The circuit described above has a plurality of passbands at harmonics of the frequency corresponding to the reciprocal of the total delay time around the alpha loop. The location of these passbands can be shifted without changing the spacing therebetween by introducing an additional heterodyning step in the alpha loop. This causes the momentary deviations of the circulating signal to change polarity after each passage of the signal around the alpha loop.

What is claimed is:

1. A system for filtering a signal, said filtering system comprising a delay means, a multistage feedback circuit coupling the output of said delay means to the input thereof, thereby to form a recirculating signal loop in which intelligence may be stored as a shift in frequency of a circulating signal, said signal loop being constructed and arranged to have a predetermined intelligence feedback factor, said integrating system further comprising an auxiliary loop, said auxiliary loop having a first input circuit associated with one stage of said multistage feedback circuit, a second input circuit adapted to receive the signal to be integrated, means associated with said first and second input circuits for combining the signals supplied thereto, and an output circuit connected to a second stage in said multistage feedback circuit, said second stage being responsive to signals received from said output circuit of said auxiliary loop to produce momentary deviations in the frequency of the signal circulating in said recirculating loop, said deviations being such that the overall intelligence feedback factor of said integrating system is reduced below said predetermined value, the stages to which said first input circuit and said output circuit of said auxiliary loop are connected being so selected that the delay encountered in the passage of a signal through said auxiliary loop is at least partially compensated for by the delay encountered in the passage of a signal between said first and second stages of said feedback circuit.

2. A system for filtering a signal, said filtering system comprising a delay means, a multistage feedback circuit coupling the output of said delay means to the input thereof, thereby to form a recirculating signal loop, at least one stage of said feedback circuit comprising means responsive to a signal supplied thereto for momentarily shifting the frequency of a signal circulating in said recirculating signal loop, and an auxiliary loop, said auxiliary loop having a first input circuit associated with one stage of said feedback circuit, a frequency responsive circuit associated with said first input circuit for providing an output signal in response to momentary deviations in the frequency of said circulating signal at the stage associated with said first input circuit, a second input circuit adapted to receive the signals to be integrated, means associated with said second input circuit and said frequency responsive circuit for combining the respective signals supplied thereby, means connecting the output of said signal combining means to said means in said feedback circuit for shifting the frequency of the circulating signal, said auxiliary loop being so constructed and arranged that the frequency deviation which is produced by said frequency shifting means in response to a signal at said first input is in a direction to reduce the frequency deviation that produced said last-mentioned signal, said means for shifting the frequency being located at a position in said feedback circuit following the stage with which said first input circuit is associated, whereby the delay encountered in the passage of a signal through said auxiliary loop is at least partially compensated for by the delay encountered in the passage of a signal between said first and second stages of said feedback circuit.

3. A system for integrating a signal including at least one periodic pulse series, said integrating system comprising a delay means, a multistage feedback circuit coupling the output of said delay means to the input thereof, thereby to form a recirculating signal loop, at least one stage of said feedback circuit comprising means responsive to pulse signals supplied thereto for momentarily shifting the frequency of a signal circulating in said recirculating loop, and an auxiliary loop, said auxiliary loop having a first input circuit associated with one stage of said feedback circuit, a frequency responsive circuit associated with said first input circuit and constructed and arranged to provide an output pulse signal in response to momentary deviations in the frequency of said circulating signal at the stage associated with said first input circuit, a second input circuit adapted to receive the signal to be integrated, means associated with said second input circuit and said frequency responsive circuit for combining the respective signals supplied thereby, means connecting the output of said signal combining means to said means in said feedback circuit for shifting the frequency of said circulating signal, the signal transfer characteristic of said auxiliary loop being such that the amplitude and polarity of the signal resulting from the frequency deviation which occurs in response to a signal at said first input are such as to reduce by a relatively small fraction the frequency deviation which produced said last-mentioned signal, said auxiliary loop further comprising means for holding the average frequency of said circulating signal at a preselected frequency, said means for shifting the frequency being located at a position in said feedback circuit following the stage with which said input circuit is associated, whereby the delay encountered by a signal in passing through said auxiliary loop is at least partially compensated for by the delay encountered in the passage of a signal between said first and second stages of said feedback circuit.

4. A system for integrating a signal including at least one periodic pulse series, said integrating system comprising a delay means, a multistage feedback circuit coupling the output of said delay means to the input thereof thereby to form a recirculating signal loop, said feedback circuit including, in the order recited, a first frequency changing means, a voltage limiter, a delay network and a heterodyne mixer, said integrating system further comprising an auxiliary loop having a first input circuit associated with the output of said limiter, a frequency responsive circuit associated with said first input circuit for providing output pulse signals in response to momentary deviations in the frequency of the circulating signal at the output of said limiter, a second input circuit adapted to receive the signal to be integrated, means associated with said second input circuit and said frequency responsive circuit for combining the respective signals supplied thereby, a deviable frequency oscillator, means connecting said last-mentioned signal combining means to said oscillator to control the frequency thereof in accordance with the instantaneous amplitude of the combined signal supplied thereby, the output of said oscillator being connected to said heterodyne mixer in a manner to cause the frequency of said circulating signal in said recirculating loop to be shifted in frequency by an amount equal to the instantaneous frequency of the signals supplied by said deviable oscillator, said first frequency shifting means being arranged to shift the frequency of said circulating signal in the opposite direction by an amount equal to the average frequency shift produced by said heterodyne mixer, the signal transfer characteristic of said auxiliary loop being such that the frequency shift of the circulating signal produced thereby substantially fully compensates for slow changes in the frequency of said circulating signal from a preselected value and only partially compensates for rapid momentary deviations of the frequency of said circulating signal from said average value, the time delay of said delay network being such that the time delay encountered in a signal passing through said auxiliary loop is substantially equal to the time delay encountered by a signal passing from said limiter to said mixer in said feedback circuit.

5. A system for integrating a signal including at least one periodic pulse series, said integrating system comprising a delay means, a multistage feedback circuit coupling the output of said delay means to the input thereof thereby to form a recircualting signal loop, said feedback circuit including in the order recited a first heterodyne mixer, a signal limiter, a delay network and a second heterodyne mixer, said feedack circuit further including an oscillator associated with said first heterodyne mixer for shifting the frequency of the signal circulating in said loop by an amount equal to the operating frequency thereof, said recirculating loop having an overall voltage gain greater than unity for signal amplitudes less than a preselected value at which said signal limited limits the amplitude of signals passing therethrough, said integrating system further comprising an auxiliary loop haiving a first input circuit associated with the output of said limiter stage, a detector circuit associated with said first input circuit and arranged to provide output signals indicative of the deviations from a preselected average value of the frequency of the signal at the output of said limiter, a second input circuit adapted to receive the signal to be integrated, a signal adder circuit associated with said second input circuit and said detector for combining the respective signals supplied thereby, a deviable frequency oscillator, said last-mentioned oscillator having an average frequency equal to the frequency of said first-mentioned oscillator, means connecting said signal adder circuit to said deviable oscillator to control the frequency thereof in accordance with the instantaneous amplitude of the combined signal supplied thereby, the output of said deviable oscillator being connected to said second heterodyne mixer thereby to cause the frequency of the said circulating signal to be shifted by an amount equal to the instantaneous frequency of the signal supplied by said deviable oscillator, said frequency shift being in a direction opposite to that produced by said first heterodyne mixer, said auxiliary loop having a relatively high gain for slow variations in the frequency of said circulating signal and a relatively low gain for momentary deviations in the frequency of said circulating signal, the deviations in frequency of said deviable oscillator attributable to signals supplied to said first input being in a direction to reduce any deviations in frequency of said circulating signal from said average value, the time delay of said delay network being such that the time delay encountered by a signal in passing through said auxiliary loop is substantially equal to the time delay encountered by a signal in passing from said limiter to said mixer in said feedback circuit.

6. The integrating system of claim 5, said system further comprising a timing loop associated with said recirculating loop, said timing loop comprising means associated with said feedback circuit at a point adjacent the input of said delay means for momentarily decreasing the amplitude of said circulating signal to a level below that set by said limiter, means associated with said feedback loop at a point adjacent the output of said delay means for detecting changes in amplitude of said circulating signal, and means connecting said last-mentioned detecting means to said amplitude changing means thereby to cause detected changes in amplitude to initiate additional changes in amplitude of said circulating signal, said connecting means including means for causing the total delay time around said timing loop to be exactly equal to the total delay time around said recirculating loop.

7. A system for integrating a signal including at least one periodic pulse series, said integrating system comprising a delay means, a multistage feedback circuit coupling the output of said delay means to the input thereof, thereby to form a recirculating signal loop, at least one stage of said feedback circuit comprising means responsive to pulse signals supplied thereto for momentarily shifting the frequency of a signal circulating in said recirculating loop, said frequency shifting means being further responsive to an error signal supplied thereto to shift the average frequency of said signal circulating in said recirculating loop by an amount proportional to the amplitude of said error signal, and an auxiliary loop, said auxiliary loop having a first input circuit associated with one stage of said feedback circuit, a frequency responsive circuit associated with said first input circuit and constructed and arranged to provide an output pulse signal in response to momentary deviations in the frequency of said circulating signal at the stage associated with said first input circuit, a second input circuit adapted to receive the signal to be integrated, means associated with said second input circuit and said frequency responsive circuit for combining the respective signals supplied thereby, means connecting the output of said signal combining means to said means in said feedback circuit for shifting the frequency of said circulating signal, the signal transfer characteristic of the portion of said auxiliary loop, including said first input circuit, said first frequency responsive means and said combining means, being such that the signal supplied to said frequency shifting means tends to reduce by a small fraction the frequency deviation which caused the last-mentioned signal to be generated, a second frequency responsive circuit associated with said first input circuit, said second frequency responsive circuit being arranged to provide an error signal proportional to the average deviation of the frequency of said recirculating signal from a preselected frequency, the portion of said auxiliary loop including said first input circuit and said second frequency responsive means having a relatively high gain, means connecting the output of said second frequency responsive means to said means in said feedback circuit for shifting the frequency of said circulating signal, said means for shifting the frequency being located at a position in said feedback circuit following the stage with which said first input circuit is associated, whereby the delay undergone by a signal in passing through said auxiliary loop is at least partially compensated for by the delay undergone by a signal in passing between said first and second stages of said feedback circuit.

8. A system for integrating a signal including at least one periodic pulse series, said integrating system comprising a delay means, a multistage feedback circuit coupling the output of said delay means to the input thereof, thereby to form a recirculating signal loop, at least one stage of said feedback circuit comprising means responsive to pulse signals supplied thereto momentarily to shift the frequency of a signal circulating in said recirculating loop, said frequency shifting means being further responsive to an error signal supplied thereto to shift the frequency of the signal circulating in said recirculating loop, and an auxiliary loop, said auxiliary loop having a first input circuit associated with one stage of said feedback circuit, a first frequency responsive circuit associated with said first input circuit for providing an output pulse signal in response to momentary deviations of the frequency of said recirculating signal at the stage associated with said first input circuit, a second frequency responsive circuit associated with said first input circuit, said second frequency responsive circuit having a relatively long time constant which causes it to be insensitive to momentary deviations in the frequency of said circulating signal and to respond to the average frequency of said recirculating signal, a second input circuit adapted to receive the signal to be integrated, means associated with said second input circuit and said first frequency responsive circuit for combining the respective signals supplied thereby, means connecting the output of said signal combining means to said means in said feedback circuit for shifting the frequency of said circulating signal, the transfer characteristic of said auxiliary loop being such that the amplitude and polarity of the signals resulting from the momentary frequency deviations which occur in response to a signal at said first input are such as to reduce by a relatively small fraction the frequency deviation which produced the last-mentioned signal, means connecting said second frequency responsive device to said means for shifting the frequency of said recirculating signal, thereby to provide means for holding the frequency of said recirculating signal at a predetermined average value, said means for shifting the frequency being located at a position in said feedback circuit following the stage with which said input circuit is associated, whereby the delay encountered by a signal in passing through said auxiliary loop is at least partially compensated for by the delay encountered in the passage of a signal between said first and second stages of said feedback circuit.

9. A system for integrating a signal including at least one periodic pulse series, said integrating system comprising a delay means, a multistage feedback circuit coupling the output of said delay means to the input thereof, thereby to form a recirculating signal loop, said feedback circuit including, in the order recited, a first frequency changing means, a delay network and a heterodyne mixer, said integrating system further comprising an auxiliary loop having a first input circuit associated with said recirculating signal loop at a point intermediate said first frequency changing means and said heterodyne mixer, a first frequency responsive circuit associated with said first input circuit for providing output pulse signals in response to momentary deviations in the frequency of the circulating signal at the point of connection of said auxiliary loop to said recirculating signal loop, a second frequency responsive circuit associated with said input circuit for providing an error signal in response to the deviations in the average frequency of said circulating signal from the preselected frequency, a second input circuit adapted to receive the signal to be integrated, means associated with said second input circuit and said frequency responsive circuit for combining the respective signals supplied thereby, a deviable frequency oscillator, means connecting said last-mentioned signal combining means to said oscillator to control the frequency thereof in accordance with the instantaneous amplitude of the combined signal supplied by said combining means, means connecting said second frequency responsive means to said oscillator to control the average frequency thereof in accordance with the amplitude of said error signal, the output of said oscillator being connected to said heterodyne mixer to cause the frequency of said circulating signal in said recirculating loop to be shifted by an amount equal to the instantaneous frequency of the signal supplied by said deviable oscillator, said first frequency shifting means being arranged to shift the frequency of said circulating signal in the opposite direction by an amount equal to the average frequency shift produced by said heterodyne mixer, the means connecting said first frequency changing means to said heterodyne mixer providing a time delay such that the time delay undergone by a signal passing through said auxiliary loop is substantially equal to the time delay undergone by a signal passing through said feedback circuit from said point of connection of said auxiliary loop to said heterodyne mixer.

References Cited in the file of this patent
UNITED STATES PATENTS
2,487,995   Tucker _____ Nov. 15, 1949